United States Patent [19]

Pine

[11] Patent Number: 4,701,431

[45] Date of Patent: Oct. 20, 1987

[54] RARE EARTH STABILIZED ALUMINUM DEFICIENT ZEOLITE

[75] Inventor: Lloyd A. Pine, Baton Rouge, La.

[73] Assignee: Exxon Research and Engineering Company, Florham Park, N.J.

[21] Appl. No.: 850,274

[22] Filed: Apr. 10, 1986

Related U.S. Application Data

[60] Continuation-in-part of Ser. No. 685,797, Dec. 24, 1984, abandoned, which is a division of Ser. No. 560,558, Dec. 12, 1983, abandoned.

[51] Int. Cl.$^4$ ............................................. B01J 29/06
[52] U.S. Cl. ........................................ 502/73; 502/65
[58] Field of Search .................................. 502/65, 73

[56] References Cited

U.S. PATENT DOCUMENTS

| | | | |
|---|---|---|---|
| 3,140,253 | 7/1964 | Plank et al. | 502/73 |
| 3,442,795 | 5/1969 | Kerr et al. | 208/120 |
| 3,506,400 | 4/1970 | Eberly et al. | 23/182 |
| 4,093,560 | 6/1978 | Kerr et al. | 252/455 |

*Primary Examiner*—Carl F. Dees
*Attorney, Agent, or Firm*—Marthe L. Gibbons; Henry E. Naylor

[57] ABSTRACT

A rare earth stabilized aluminum deficient zeolite having the structure of faujasite is provided. The zeolite is produced by contacting a Y-type zeolite with a dealuminating agent to remove aluminum from the crystal structure of the zeolite and ion exchanging the zeolite with a specified amount of rare earth metal cations to stabilize the aluminum deficient zeolite.

11 Claims, 3 Drawing Figures

RARE EARTH STABILIZED ALUMINUM DEFICIENT ZEOLITE

CROSS-REFERENCE TO RELATED APPLICATIONS

This application is a continuation-in-part application of U.S. patent application Ser. No. 685,797 filed Dec. 24, 1984, and now abandoned which is a Rule 60 Divisional application of U.S. patent application Ser. No. 560,558 filed Dec. 12, 1983, and now abandoned the teachings of both of which are hereby incorporated by reference. Also related is U.S. patent application Ser. No. 715,601 filed Mar. 25, 1985 and now abandoned which is a continuation-in-part of U.S. patent application Ser. No. 560,558 now abandoned.

BACKGROUND OF THE INVENTION

1. Field of the Invention

This invention relates to rare earth metal stabilized-aluminum deficient crystalline alumino-silicate zeolites, and methods for their preparation.

2. Description of Information Disclosures

Crystalline aluminosilicate zeolites having a high silica to alumina mole ratio may be prepared by various methods. High silica to alumina mole ratio zeolites often have desirable characteristics for use in certain processes. With some types of zeolites, it is possible to control silica to alumina mole ratio during the synthesis step. However, this does not work well for zeolites having the same structure as natural faujasite. An example of such a zeolite is zeolite Y. With these types of zeolite, it is usually necessary to do some post-synthesis step in order to modify significantly the silica to alumina mole ratio. One way to do this is to add silica to the structure. A general method of doing this involves exchange of alumina in the crystal structure (i.e., framework) of the zeolite for silica from an outside source. This can be accomplished by treatment with ammonium-fluorosilicate as described in U.S. Pat. No. 4,503,023. A second method uses silicontetrachloride as the source of silica (H. K. Beyer and I. Belenykaja, *Catalysis by Zeolites,* page 203, 1980, Elsevier Scientific Publishing Company, Amsterdam). The older and more typical way of increasing the silica to alumina ratio of the Y zeolites involves some sort of dealumination. The literature on these methods is often confusing as the term "dealumination" or "alumina deficient" does not always have the same meaning. Several different zeolites which are quite different but that have all been described as "dealuminated" or "alumina deficient" are described in more detail below:

1. In Case 1, the terms are used to describe the removal of alumina from the zeolite structure by converting it from the tetrahedral form required by the zeolite structure to an octahedral form. This octahedral or non-zeolite alumina is not physically removed so the silica to alumina ratio as measured by chemical analysis has not changed but the silica-alumina ratio of the remaining zeolite has increased. An example of this sort of dealumination is the transformation of Y to an ultrastable Y zeolite (USY). The silica to alumina mole ratio of the initial Y zeolite is usually near 4 whether measured by elemental analysis or some method that measures the actual ratio in the zeolite crystal structure. After hydrothermal treatment, the silica to alumina mole ratio in the zeolitic crystal structure is typically about 8, but the silica to alumina ratio as measured by elemental analysis has remained unchanged. The determination of the silica to alumina mole ratio in the zeolitic crystal structure is usually done by X-Ray measurements of the unit cell size or by solid state nuclear magnetic resonance measurements.

2. In a second case, the term "dealumination" is used to describe the removal of the octahedral of non-zeolitic alumina such as produced in Case 1 above further without removal of tetrahedral or zeolitic alumina. For example, this can be done by chemically treating a sample of zeolite that has already been transformed from Y to ultrastable Y zeolite. The chemical treatment is kept mild enough so that only the alumina that is not part of the crystal structure of the zeolite will be removed. In this case, the silica to alumina ratio as measured by chemical analysis will increase while the silica to alumina ratio of the remaining zeolite as measured by X-Ray diffraction or nuclear magnetic resonance will not increase.

3. In Case 3, the term "dealumination" is both less precise and more complicated because it describes situations where alumina is removed both from the zeolitic crystal structure and at the same time physically removing it from the sample of zeolite that is being treated. Examples of ways of carrying this out usually involve either some form of acid treatment or use of a complexing agent such as ethylenediaminetetraacedic acid (EDTA). In this form of dealumination, there is often a reordering of the zeolite crystal structure. It is the degree to which this reordering takes place that distinguishes several subcases of this type of dealumination. This reordering of the zeolite crystal structure is usually described as taking place by the migration of silicon atoms from some other part of the zeolite to fill the defect sites or hydroxyl "nests" left in the structure by the removal of the aluminum atoms. In some cases, this reordering of the zeolite crystal structure is deliberately encouraged by a post-treatment with either heat or steam.

a. The most common subcase is that as the alumina is removed from the zeolite crystal structure, the reordering takes place so that the silica-alumina ratio in the crystal structure has been increased by the same amount as the alumina that is chemically removed.

b. In this subcase, the conditions are carefully controlled in order to remove aluminum from the zeolite crystal structure so that little or no reordering of the crystal takes place. In this case, the empty sites or hydroxyl nests created by the removal of aluminum atoms still remain. If no reordering has taken place and the starting zeolite had no extraneous non-zeolitic alumina present, the silica to alumina ratio as measured by the unit cell size will not have changed but the silica to alumina ratio as measured by chemical analysis will have increased. It is this type of alumina deficient products that are the subject of this invention.

c. The third subcase occurs frequently but may not always be recognized. If the conditions of an acid treatment to remove alumina from the structure are too severe, the zeolite structure suffers partial collapse so that the remaining crystal structure has a higher silica-alumina ratio as measured by magnetic nuclear resonance or unit cell size than would be measured by chemical analysis. This partial collapse is very similar to the transformation of zeolite Y to an ultrastable Y zeolite.

There are several accepted techniques for measuring the silica to alumina ratio in the zeolite crystal structure in the presence of non-zeolitic silica or alumina. One of the newest methods is solid state nuclear magnetic resonance which can distinguish between aluminum atoms that are in a tetrahedral coordination, which is required by the Y zeolite structure, or in an octrahedral configuration which is typical of the alumina that is still present but no longer part of the crystal structure of the zeolite. Another and slightly less common method is the use of infrared spectroscopy as described by Maxwell, et al. (Maxwell, I. E.; Van Earp, W. A.; Hayes, G. R.; Couperus T.; Huis R.; and Clague, A. D. H., *Journal of The Chemical Society*, Chemical Communications, 1982 p. 523). A paper by Engelhard, et al. gives a good description of the NMR and infrared techniques and compares the two methods relative to chemical analysis (G. Engelhard, U. Lohse, V. Patzelovga, M. Magi, and E. Lippmaa, *Zeolites*, Vol. 3, page 233, 1983). A third and older technique is the use of X-Ray diffraction to measure the unit cell size of the zeolite crystal. The unit cell size method depends on the fact that a silicon-oxygen bond is shorter than that of an aluminum-oxygen bond so that as alumina is removed from the crystal structure and replaced by silica, there is an overall contraction of the unit cell size which is directly proportional to the silica to alumina ratio in the zeolite crystal structure. This technique is described in U.S. Pat. No. 3,056,400 by Eberly, et al. and in the work of Breck and Flannigan and in the Kerr U.S. Pat No. 3,442,795. The Kerr reference is particularly useful because, in addition to pointing out the existence of hydroxyl "nests", it discusses, in columns 15 and 16, the fact that aluminum atoms can be removed from the tetrahedral sites of the zeolite without the replacement by silicon atoms. This is an example of one of the types of dealumination described earlier (subcase 3b) and it is in this sense that the term "dealuminated zeolite" is used to describe the products of this invention.

It is well known in the art that exchange of Y type zeolites with rare earth metal ions increases both their thermal and hydrothermal stability. The exact mechanism of this stabilization is still open to speculation. The two most common theories cited in the literature are as follows: (1) the rare earth metal ions, by virtue of occupying exchange sites, slow down the rate that aluminum atoms leave the zeolite crystal structure; (2) the physical presence of the rare earth metal ions in the sodalite cage act to support physically the sodalite structure which is a key building block of the zeolite Y. Some evidence of the second mechanism is given in a paper by Sherzer, et al. (*Journal of Physical Chemistry*, Vol. 79, p. 1194, 1975). However, there is no suggestion in the prior art that exchange by rare earth metal ions can stabilize a faujasite type structure that contains a large number of hydroxyl nests that have not been filled by silicon atoms. The present invention is based on the finding that this particular form of alumina deficient zeolite can be stabilized in this dealuminated state. The use of rare earths to stabilize a Y or USY zeolite so that it retains this alumina deficient structure in the presence of heat or steam has not been reported in the prior art.

U.S. Pat. No. 3,442,795 discloses dealuminating a sodium Y zeolite with ethylenediaminetetracedic acid complexing agent and then ion exchanging the dealuminized zeolite with the rare earth metal-containing solution. Most of the examples in this patent deal with dealumination of the Y zeolites with ethylenediaminetetracedic acid. The data given in Table E show an example of dealumination where the aluminum is removed from the crystal structure and physically from the zeolite without the reordering and the hydroxyl "nests" being filled by silica atoms. This is shown by Examples 5, 6 and 7 where the silica to alumina mole ratio as measured by chemical analysis increases from 5.8 to 9.12, while the unit cell size or lattice constant remains essentially the same. This is also shown in Examples 9 through 12 where a low silica to alumina sodium Y zeolite was given a similar treatment. These two sets of examples illustrate two other points that are also shown in the present invention. First, the degree of dealumination that can be accomplished without loss of crystallinity is dependent upon the silica to alumina ratio of the starting material. A second point illustrated by these data is that if dealumination is carried too far, in addition to a loss in crystallinity, there will be a spontaneous lowering of the unit cell size even under mild conditions. This is shown by comparison of Example 8 with Example 7 and Example 13 with Example 12. Examples 20 and 21 of this patent give examples of dealumination followed by rare earth exchange, followed by a subsequent steaming. The final steaming conditions in these examples are so severe that the zeolite crystal structure could no longer be alumina deficient. These materials would fit under Case 3a described above.

U.S. Pat. No. 3,506,400 discloses impregnating a dealuminized zeolite with metal cations. The term "dealuminized" as used in this patent involves the case where alumina is first removed from the crystal structure by a steam treatment and then the amorphous alumina that is still present in the sample is chemically removed by treatment with a chelating agent or by acid extraction as in Case 2 described earlier. In the examples given in Table 6 of this patent where unit cell size data are available on the faujasite type zeolites, there is no evidence that the procedures taught have resulted in a material that contains hydroxyl "nests" or that the zeolite crystal structures are alumina deficient. The products of this patent would not be expected to be deficient in zeolitic alumina. Eberly teaches a three step process that comprises a partial removal of soda so that a critical heat-steaming step will remove tetrahedral alumina from the zeolite crystal structure and convert it to octrahedral or amorphous alumina. When alumina is removed from the zeolite crystal structure by hydrothermal treatment, the remaining structure recrystallizes to a higher silica to alumina ratio. Hence, this new structure is believed to be complete so that it does not have any defect sites that are missing tetrahedral alumina atoms. The third step is an acid leaching to remove the amorphous alumina that was created by the hydrothermal treatment. (This is a Case 2 dealumination.)

U.S. Pat. No. 4,093,560 discloses dealuminizing an aluminum silicate zeolite, which may be zeolite Y, with a solution comprising an inorganic acid such as HCl and a salt of a complexing agent such as ethylenediamenetetracedic acid. The dealuminized zeolite is then ion exchanged with a solution of rare earth metals. This patent teaches a special method of leaching alumina from a zeolite that avoids the severe losses in zeolite stability that are normally associated with a highly alumina deficient structure. The teaching is to carry out the leaching at such a slow rate that silicon atoms can migrate to fill the empty sites or hydroxyl "nests" left in the structure by the leaving aluminum atoms (column 2, lines 45 to 49). This is analogous to the recrystallization of the zeolite to a defect free structure of a higher silica to alumina ratio achieved by hydrothermal treating such as was taught by Eberly. The whole purpose of this special method of leaching is to avoid a large formation of hydroxyl "nests" or defect sites which would make the material less thermally stable. Note that in Example 3 the mixture was stirred for two additional days after the 80 hour period during which acid had been added in the leaching step. This is to allow time for the silicon atoms to migrate to fill any empty sites left by the removal of aluminum atoms from the zeolite crystal structure. In a publication in the *Journal of Physical Chemistry* describing this same dealumination technique, the products are shown to have improved thermal stability as alumina is removed. This is further evidence that this method of dealumination does not produce a structure containing a large number of hydroxyl "nests" or defect sites. Hence, it is an example of Case 3a dealumination.

SUMMARY OF THE INVENTION

In accordance with the invention, there is provided an aluminum deficient crystalline aluminosilicated zeolite having the crystal structure of a faujasite and having a composition, in its anhydrous state, in terms of mole ratio of oxides, as represented by the following formula:

$$(1-Z)(aM_2O+bR_2O+3wRE_2O_3) \cdot (1-Z)Al_2O_3 \cdot XSiO_2$$

wherein RE represents a cation of a single rare earth metal or of a mixture of rare earth metals, wherein "w" ranges from a value of about 0.054 to about 0.217, said value w being the minimum amount of rare earth in said zeolite needed to stabilize said aluminum deficient zeolite; where R is an alkali metal cation; where M is selected from the group consisting of hydrogen ion, ammonium ion and mixtures thereof, wherein "a" ranges from zero to 1−3w; wherein "b" ranges from zero to 1−3w; wherein a+b+3w=1; wherein Z ranges from about 0.92 to 0.27, said value Z being the maximum fraction of alumina in the crystal structure that can be removed, and wherein X ranges from about 3.9 to about 54, said zeolite having a unit cell size ranging from about 24.25 to about 24.75 Angstroms, said zeolite having a unit cell size greater than the stoichiometric unit cell size when measured after heating for two hours at 1300° F., said zeolite falling within the area of FIG. 1 designated "stabilized zone".

In accordance with the present invention, there is also provided a method for the preparation of the above-described zeolites.

DETAILED DESCRIPTION OF THE INVENTION

Figure 1:
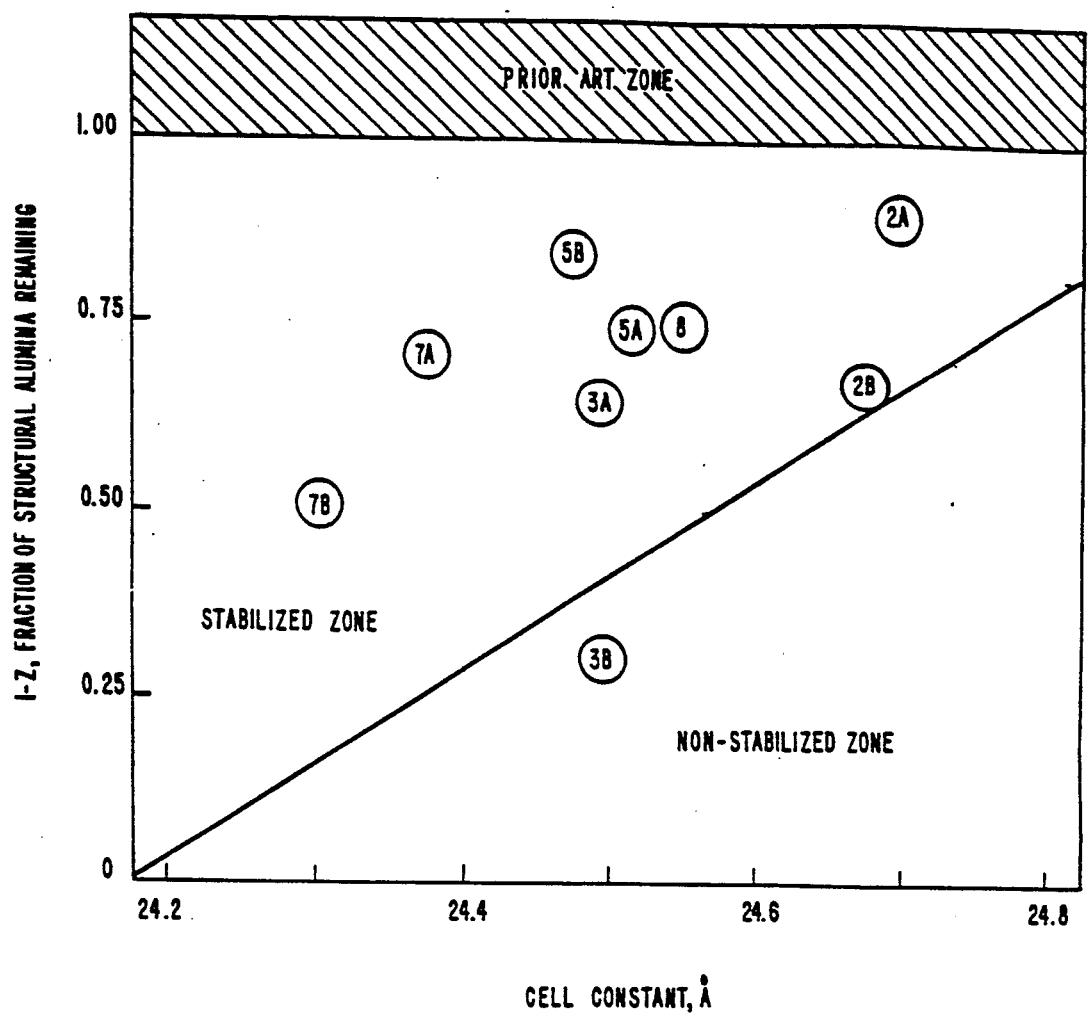
FIG. 1 is a graph showing unit cell size constant versus fraction of structural alumina remaining in various zeolites.

The aluminum deficient rare earth metal stabilized crystalline aluminosilicate zeolites of the present invention are Y-type zeolites that have the crystal structure of faujasite and that have a composition that can be represented in their anhydrous state, in terms of mole ratios of oxides by the formula (1):

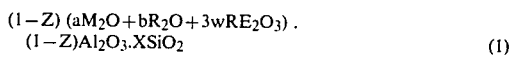

wherein R is an alkali metal and wherein "b" ranges in moles from 0 to 1−3w and wherein M is selected from the group consisting of hydrogen ion, ammonium ion and mixtures thereof, and "a" ranges in moles from 0 to 1−3w; and wherein RE represents a cation of a rare earth metal. The rare earth metal cation may be a single rare earth metal or a mixture of rare earth metals of elements having atomic numbers ranging from 57 to 71. W ranges from 0.054 to 0.217 and describes a minimum amount of rare earth metal cations that must be present in the zeolite to stabilize the aluminum deficient anionic crystal structure. To balance the electronic charges, "a"+"b"+3w=1. The "w", minimum value of rare earth metal cations, varies as the unit cell size varies from 24.25 to 24.75 Angstroms. The relationship between "w" and unit cell size is given by the equation (2):

$$w^{-1} = 20.3 - 28 \text{ (unit cell size} - 24.19 \text{ Angstroms)} \quad (2)$$

In formula (1) of the composition of the zeolite, Z ranges from about 0.92 to 0.27 and represents a maximum fraction of structural aluminum, calculated as alumina ($Al_2O_3$), that can be removed to produce a zeolite of the present invention. The relationship between Z and the unit cell size is given by equation (3):

$$1 - Z = 1.3 \text{(unit cell size} - 24.19 \text{ Angstroms)} \quad (3)$$

X ranges from 3.9 to about 54. The zeolite has a unit cell size ranging from about 24.25 Angstroms to about 24.75 Angstroms. For example, when X equals 3.9, the unit cell size is 24.75 Angstroms. When X equals 54, the unit cell size is 24.25 Angstroms. A preferred zeolite has the formula (4):

$$0.20(NH_4)_2O \cdot 0.05Na_2O \cdot 0.25RE_2O_3 \cdot Al_2O_3 \cdot 9SiO_2 \quad (4)$$

Figure 2:
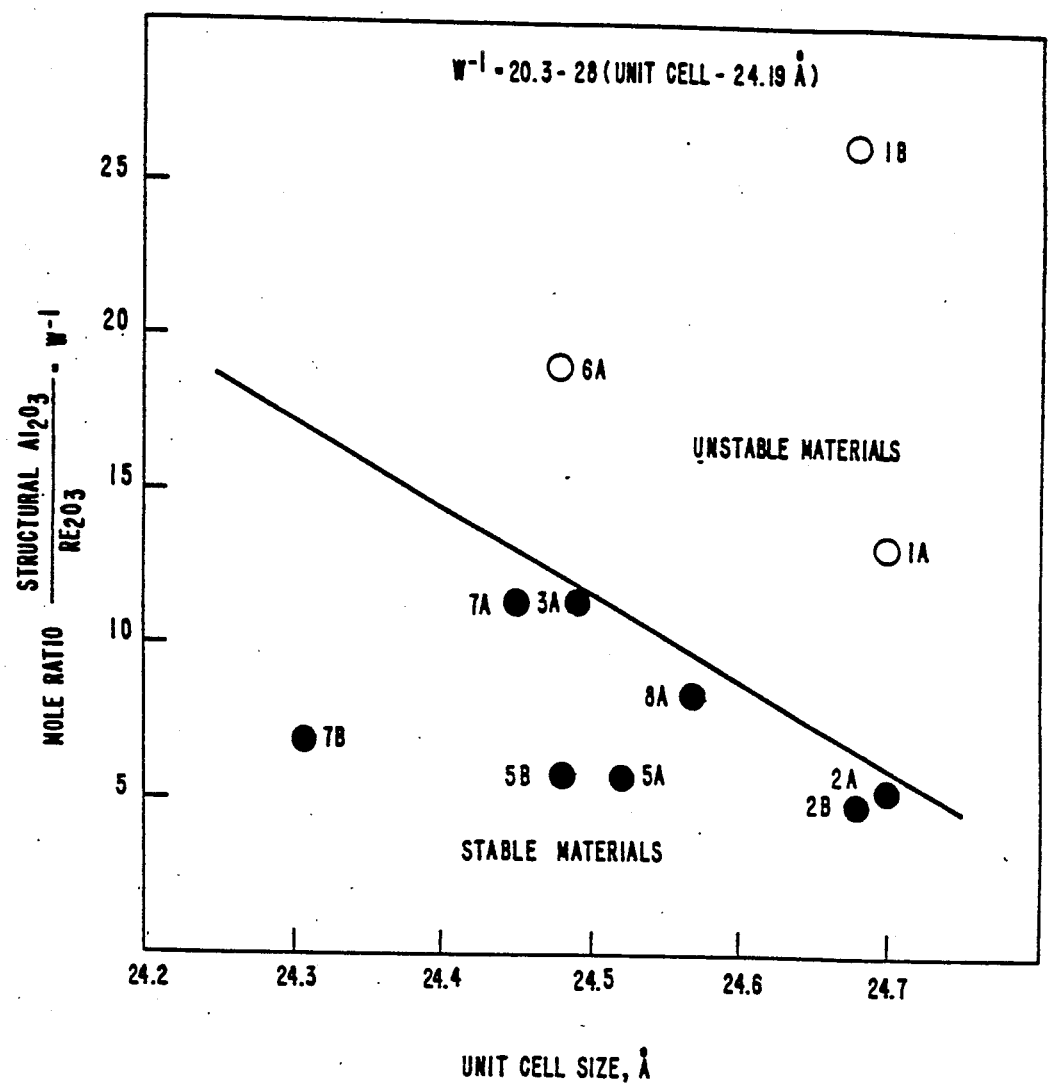
FIG. 2 is a graph showing unit cell size versus mole ratio of structural alumina to rare earth metal oxide.

The aluminum deficient rare earth metal-stabilized crystalline aluminosilicate zeolites of the present invention are more easily described by referring to the figures. FIG. 1 describes three zones. The top zone or prior art zone is the well known area where rare earth metals are capable of stabilizing normal Y type zeolites that are not alumina deficient in the crystal structure. The other two zones are divided into a stabilized zone which contains the zeolites of this invention and the non-stabilized zone which is outside the limits of this invention. The line dividing these two zones is described mathematically by equation 3. Note that this line slopes such that materials of very low unit cell size or very high silica to alumina mole ratio can have a larger fraction of structural alumina removed and still be stabilized by subsequent addition of rare earth metals. At the very high unit cell sizes, which represent structures with low silica to alumina mole ratios, only a small portion of the structural alumina can be removed and still have a structure that can be stabilized by subsequent rare earth metal exchange. The slope of this line is indicative of the well known fact that high silica structures have higher thermal stability, higher hydrothermal stability, and better tolerance to acid than structures of lower silica content. This is analogous to the slope of the line given in the figure in Kerr's U.S. Pat No. 3,442,795 where Kerr describes the percentage of alumina that can be removed by his technique and still retain 50% crystal retention. Note that the line shows that only a small amount of alumina can be removed from the materials having very low silica to alumina ratios and a much larger portion of alumina can be removed from materials that start with a higher silica to alumina ratio. The zone bounded by the line described by Equation 3 and the prior art zone describes the amount of dealumination that we can achieve depending on the starting material and still be able to stabilize the material by subsequent rare earth exchange. FIG. 2 describes the second critical limit on the zeolites of this invention. Again, the figure is divided into a zone containing unstable materials and a zone containing stable materials of this invention. The boundary is a line that slopes according to the unit cell size. The equation describing the line on this figure is the same as equation 2 on page 4. This boundary simply recognizes the fact that even if one is able to achieve the dealuminated material described in FIG. 1, it will not be stable unless it has been exchanged with a certain amount of rare earths. Again, it describes the fact that the higher silica to alumina ratio materials, due to their inherent stability even when dealuminated, require less rare earths to stabilize them than the high unit cell size or low silica-alumina materials. Hence, the zeolites of this invention are those that fall into the stabilized zone as shown by FIG. 1 and have a high enough level of rare earth metal exchange as shown in FIG. 2 to achieve stabilization. Since both the amount of dealumination that can be achieved and the required amount of rare earth metals are both a function of the unit cell size of the starting materials, it makes the molecular formulas describing these new and unconventional materials more complex than usual.

The zeolites of the present invention have uniform pore diameters ranging from about 6 to about 15 Angstroms, preferably from 6 to 10 Angstroms.

Various methods may be used to prepare the zeolites of the present invention. A preferred method of preparation of the aluminum deficient rare earth stabilized zeolites of the present invention is as follows:

The initial crystalline aluminosilicate zeolite used as starting material has a composition, in its anhydrous state, in terms of mole ratios of oxides, that can be represented by formula (5):

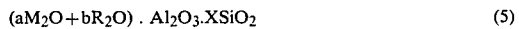
$$(aM_2O + bR_2O) \cdot Al_2O_3 \cdot XSiO_2 \quad (5)$$

wherein R represents an alkali metal cation and M is a cation selected from the group consisting of hydrogen cation, ammonium cation and mixtures thereof. The values $a+b=1$. The value "a" may range from 0 to 1. The value "b" may range from 0 to 1.

The alkali metal cation may be a single alkali metal, such as sodium or a mixture of different alkali metals; X ranges from 3.9 to 54. Thus, when X equals 3.9, the unit cell size is about 24.75 Angstroms; when X equals 54, the unit cell size is about 24.25 Angstroms. The unit cell size of the initial zeolite may range from about 24.25 to about 24.75 Angstroms. The initial zeolite has the crystal structure of faujasite and is a Y-type zeolite which may have been derived from a naturally occurring zeolite or a synthetically prepared zeolite. Zeolite Y is described in U.S. Pat. No. 3,120,017.

As a specific example of an initial zeolite, a NaY or a NaHY zeolite having a silica to alumina mole ratio ranging from about 4 to about 10 is contacted with a dealuminating agent for a time sufficient to remove at least about 5 percent, preferably 10 percent, more preferably from about 20 to about 40 percent of the aluminum atoms present in the anionic framework (i.e., crystal structure) of the initial zeolite. The dealuminating agent may be inorganic acid, or organic acid, a chelating agent or mixtures thereof.

Suitable inorganic acids include hydrochloric acid, sulfuric acid, and nitric acid.

Suitable organic acids include monocarboxylic acids, and polycarboxylic acids such as, for example, formic acid, acetic acid, trichlorocetic acid, trifluoroacetic acid, oxalic acid, malonic acid, succinic acid, citric acid, gluconic acid and tartaric acid. Some of these acids also act as chelating agents. The concentration of the acid is suitably maintained such that the pH of the dealuminating agent-zeolite mixture is usually greater than about 3, preferably between about 2 and about 5. The lower end of the pH of the acid solution is limited by the silica to alumina ratio of the starting material. High silica to alumina (i.e., low unit cell) starting materials can tolerate low pH limits without loss of crystal structure.

Suitable chelating agents or complexing agents include materials which form a complex with aluminum such as ethylenediaminetetraacetic acid, and derivatives thereof, such as diethylene triamine pentaacetic acid, nitrilotriacetic acid. The acid and chelating or complexing agent can be used in combination.

The initial zeolite is contacted with the dealuminating agent at a temperature ranging from about 150° to about 220° F., preferably from about 180° to about 210° F. for a period of time ranging from about 0.5 to about 8 hours. The reaction is normally conducted at atmospheric pressure; however, high pressures could be utilized, especially when it is desired to use higher temperatures and shorter time.

Simultaneously with the dealuminating agent or after the dealuminating step, the initial or dealuminated zeolite is contacted with a fluid medium comprising rare earth metal cations of a single rare earth metal or of a mixture of rare earth metals, herein designated "RE", to ion exchange (replace) at least a portion, preferably substantially all of the cations of the initial zeolite with rare earth metal cations. The rare earth metal cation exchange is conducted at conditions and for times sufficient to produce a zeolite having the rare earth metal content that will stabilize the aluminum deficient zeolite and fit the formula given herein for new aluminum deficient rare earth exchanged zeolites. The medium comprising the rare earth metal cations is typically a rare earth metal salt added to an aqueous solution, such as salts of cerium, lanthanum, praseodymium, neodymium, promethium, samarium, europium, gadolinium, terbium, dysprosium, holmium, erbium, yttrium, thulium, scandium, lutecium and mixtures thereof.

The concentration of the rare earth metal cations used would generally be in excess of the number of cations needed to exchange theoretically all of the exchangeable cations of the zeolite with rare earth metal cations. Suitable rare earth ion exchange conditions include a temperature ranging from about 60° to about 220° F., preferably from about 150° to about 200° F., and a time ranging from about 0.5 to about 4 hours, that is, a time sufficient to provide at least the minimum amount of rare earth metal cations required to stabilize the zeolite. The pressure is not critical. Typically, the ion exchange is conducted at atmospheric pressure although superatmospheric pressures or subatmospheric pressures may be used.

The aluminum deficient rare earth stabilized crystalline aluminosilicate is recovered from the ion exchange medium by filtration, washed with water, dried at a temperature ranging from about 180° to about 250° F., calcined at a temperature ranging from about 800° to about 1200° F. The aluminum deficient rare earth stabilized crystalline aluminosilicate zeolites of the present invention prepared by the above-described method fall within the region in accompanying FIG. 1 designated "stabilized zone". In FIG. 1, the unit cell size constant in Angstroms is plotted against $1-Z$, which is the fraction of structural aluminum or alumina remaining. By the term "stabilized" with reference to the zeolite is intended herein that the aluminum deficient zeolite has improved ability to retain its crystal structure and that it has improved resistance to changes in unit cell size in the presence of steam and heat. Furthermore, the aluminum deficient zeolites of the present invention, after heating for either 2 hours at 1300° F. or 1 hour at 1500° F., still retain this alumina deficient state. FIG. 2 shows that the higher the unit cell size the more rare earth metal cations are needed for stabilization.

The new zeolites of the present invention may be used alone as catalysts or sorbents. Furthermore, they may be used as catalyst components, sorbent components, catalyst support, or sorbent support by compositing them with sorption active materials or catalytic materials, for example, with materials which function as hydrocarbon treating, including conversion, catalysts in such processes as cracking, hydrocracking, isomerization, polymerization, disproportionation, demetallization, hydrogenation, including aromatics hydrogenation, hydrodesulfurization, hydrorefining, denitrogenation, etc. The zeolites of the present invention may be composited with known catalytic metals and compounds of metals of Groups IB, IIA, IIB, IIIB, IVA, IVB, VB, VIB, VIIB, and VIII and mixtures thereof of the Periodic Table of Elements as given in the *Handbook of Chemistry and Physics* published by Chemical Rubber Company, Cleveland, Ohio, 46th Ed., 1964. The catalytically active metals and metal compounds may be combined with the zeolites of the present invention in any way known in the art, such as by ion exchange, by vapor phase deposition, impregnation, at any suitable stage of the zeolite preparation, including before or after calcination of the zeolite. The zeolites of the present invention may also be composited with non-metal catalytic components, inert materials, supports such as inorganic oxides, for example, silica, silica-alumina, alumina, zirconia, magnesia, titania; clay; acid treated clays, carbon. When the zeolite is used with other catalytic or inert materials, the zeolite may be used as a composite particle or the zeolite may be used as a physical mixture of separate particles of the zeolite and particles of the other catalytic or inert component.

The operating conditions to be employed in the present invention are well known and vary with the particular reaction desired. Table "A" summarizes typical reaction conditions effective in the present invention.

TABLE "A"

| Principal Reaction Desired | Temperature, °F. | Total Pressure, psig |
|---|---|---|
| Hydrorefining | 500–900 | 50–2000 |
| Hydrodesulfurization | 600–900 | 60–3500 |
| Hydrocracking | 400–900 | 200–3000 |

TABLE "A"-continued

| Principal Reaction Desired | Temperature, °F. | Total Pressure, psig |
|---|---|---|
| Catalytic Cracking | 700–1300 | 0–150 |
| Catalytic Reforming | 850–1000 | 50–1000 |

The catalyst or sorbent of the present invention may be disposed in the reaction zone as a fixed bed, ebullated bed, fluid bed, transfer line (suspension), moving bed or slurry of particles in the feed, etc. The feedstocks suitable for use in the process of the present invention include any of the well known feeds conventionally used in the particular process. Thus, in hydrocarbon treating and conversion processes, the hydrocarbonaceous feed may be derived from any source such as petroleum, shale, tar sand, coal liquefaction products, including coal liquefaction bottoms and mixtures thereof. The zeolites of the present invention are particularly well suited for use in catalytic cracking of hydrocarbons.

PREFERRED EMBODIMENTS

The following examples are presented to illustrate the invention:

COMPARATIVE EXPERIMENT

In this comparative experiment, the zeolite starting material was a low soda type Y zeolite containing less than 4.0 weight percent $Na_2O$ per total zeolite, herein designated Zeolite No. 1. A solution was made by dissolving 272 gms of ammonium chloride and 92 ml of concentrated hydrochloric acid in 2400 ml of water. 180 ml of a solution containing the concentrated chlorides of a commercially available rare earth mixture was added to the above solution. The concentration of this rare earth chloride solution was equivalent to 484 gms of $RE_2O_3$/liter. 463 gms of Zeolite No. 1 were then stirred into the rare earth-acid solution. The mixture was heated to 180°–190° F. and stirring was continued for 2 hours. The zeolite was recovered by filtration and the wet cake divided into two equal portions. One half was washed by stirring for 30 minutes in 2400 ml of hot water. After filtering and drying at 250° F., this material was labeled 1A. The other half of the wet cake was given a second two-hour treatment at 180°–190° F. with a solution made from 46 ml of concentrated hydrochloric acid, 136 gms ammonium chloride and 90 ml of the same rare earth chloride solution all dissolved in 1200 ml of water. This sample, 1B, was filtered, washed, and dried the same as for sample 1A above. The inspections on samples 1A and 1B are compared in Table I with those for the Zeolite No. 1 starting material. It can be seen that in both cases considerable alumina was leached from the Zeolite No. 1 starting material without significantly changing the cell constant. The thermal stability of samples 1A and 1B was determined by heating a small part of each sample and measuring the cell constant on the treated sample. In both cases there was considerable shrinking of the crystal structure. These samples are not fully rare-earth exchanged to the required level so they are not well stabilized and are not materials of this invention.

TABLE I

| Sample | Zeolite No. 1 | 1A | 1B |
|---|---|---|---|
| Chemical Anal., Wt. % | | | |
| $SiO_2$ | 72.2 | 70.45 | 78.1 |

TABLE I-continued

| Sample | Zeolite No. 1 | 1A | 1B |
|---|---|---|---|
| Al₂O₃ | 24.8 | 21.34 | 17.6 |
| RE₂O₃[1] | 0 | 5.20 | 2.16 |
| Na₂O | 2.50 | 1.91 | 1.29 |
| SiO₂ to Al₂O₃ ratio | 4.94 | 5.61 | 7.54 |
| Physical Properties Cell Constant, Å | | | |
| (dried at 250° F.) | 24.70 | 24.70 | 24.68 |
| X-Ray Crystallinity, % | 183 | 170 | 143 |
| Al₂O₃ deficiency, % | 0 | 12 | 34 |
| Cell Constant After Heating, Å | | | |
| 2 Hrs @ 1300° F. | — | 24.60 | 24.52 |
| 2 Hrs @ 1400° F. | — | 24.63 | 24.57 |
| 1 Hr @ 1500° F. | — | 24.60 | 24.52 |

[1]RE₂O₃ denotes rare earth metal oxide.

EXAMPLE 1

The samples from the comparative experiment described above were converted into the materials of this invention by further treating them with rare earth chloride solution. Sample 1A was stirred into 1000 ml of water to which 25 cc of the mixed rare earth chloride solution described in the comparative experiment had been added. The mixture was heated to 150° F. and stirred for 3 hours. The zeolite was removed from the rare earth solution by filtration and washed by stirring for 30 minutes in 800 ml of hot water. After filtering and drying at 250° F., the sample was labeled 2A. Sample 1B was treated in the same manner to produce sample 2B. The inspection on these samples are given in the table below along with the cell constants measured after a standard heat treatment. It can be seen that the cell constants of these samples were changed very little by the heat treatment.

TABLE II

| Sample | 2A | 2B |
|---|---|---|
| RE₂O₃, Wt. % | 11.60 | 10.3 |
| X-Ray Crystallinity, % | 194 | 131 |
| Cell Constant After Heating, Å | | |
| 2 Hrs @ 1300° F. | 24.67 | 24.69 |
| 2 Hrs @ 1400° F. | 24.68 | 24.69 |
| 1 Hr @ 1500° F. | 24.67 | 24.66 |

Samples 2A and 2B are zeolites in accordance with the present invention.

EXAMPLE 2

A sample of a Y type zeolite synthesized so as to have a high SiO₂-Al₂O₃ ratio, herein designated Zeolite No. 3, was converted into the material of this invention by giving it the identical treatments used to produce samples 2A and 2B. The analytical measurements and its thermal stability are given in the table below. It can be seen that in the case of sample 3B, so much alumina was removed from the crystal structure that it collapsed and became mostly amorphous material. Sample 3A is a zeolite in accordance with the present invention.

TABLE III

| Sample | Starting Zeolite No. 3 | 3A | 3B |
|---|---|---|---|
| Chemical Analysis, Wt. % | | | |
| SiO₂ | 81.1 | 85.5 | 92.4 |
| Al₂O₃ | 16.3 | 11.2 | 5.4 |
| RE₂O₃ | 0 | 3.14 | 1.83 |
| Na₂O | 1.47 | .12 | .01 |
| SiO₂/Al₂O₃ | 8.46 | 12.98 | 29.1 |
| Physical Properties Unit Cell, Å | | | |
| (dried at 250° F.) | 24.51 | 24.49 | 24.38 |
| Crystallinity, % | 311 | 235 | 28.6 |
| Al₂O₃ deficiency, % | — | 35 | 71 |
| Unit Cell After Heating, Å | | | |
| 2 Hrs @ 1300° F. | — | 24.46 | — |
| 1 Hr @ 1400° F. | — | 24.48 | — |
| 1 Hr @ 1500° F. | — | 24.49 | — |

EXAMPLE 3

In this example, the zeolite starting material was a low soda ultrastable Y zeolite having a unit cell size below 24.55 Å, herein designated Zeolite No. 4. Thirty pounds (dry basis) was stirred for 2 hours at 180°–190° F. in a solution made by dissolving 30 lbs of ammonium sulfate and 3.68 liters of concentrated hydrochloric acid in 200 lbs of water. The solid was removed by filtration and the wet cake washed by reslurrying in 150 lbs of hot water for about 20 minutes. The solid was recovered by filtration and the wet cake divided into two equal portions. One portion was dried at 250° F. and labeled 4A. One portion was further extracted by stirring for 2 hours at 190° F. in a solution made by dissolving 15 lbs of ammonium sulfate and 1840 ml of concentrated hydrochloric acid in 100 lbs of water. The solid was recovered by filtration and the wet cake washed with 3–8 lb portions of hot water. The material was further washed by stirring for about 20 min. in 70 lbs of hot water. After filtering and drying the solid was labeled 4B. The analytical inspections obtained on these two samples are given in Table IV.

Since the Zeolite NO. 4 starting material used to make samples 4A and 4B contained alumina in addition to that in the zeolite crystal structure, the degree of alumina deficiency in the crystal structure cannot be determined by direct chemical analysis. In order to properly evaluate the effects of acid extraction, it is necessary to distinguish whether the alumina being removed is coming from the crystal structure of the zeolite or from some other non-frame-work source. The most direct measure of the SiO₂/Al₂O₂ ratio of the crystal lattice is the unit cell constant determined by X-ray diffraction. These two parameters are related by the equation developed by Breck and Flannigan that is given below. By comparing the SiO₂/Al₂O₃ ratio from the cell constant with that from chemical analysis, it is possible to decide whether the crystalline framework is alumina deficient or whether the sample contains extra non-framework octahedral alumina.

$$\text{Unit Cell Constant} - 24.19 = \frac{1.666}{1 + Si/Al}$$

Figure 3:
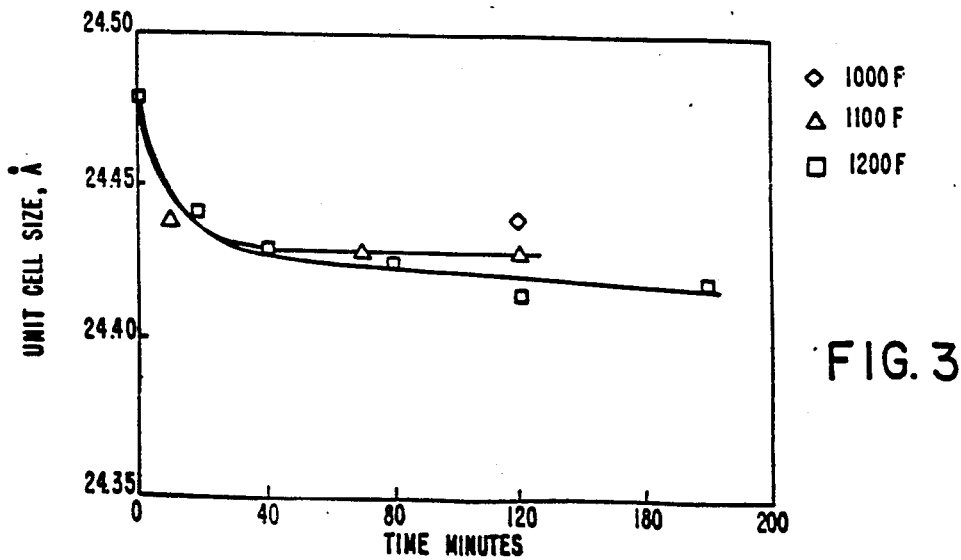
FIG. 3 is a graph showing unit cell size versus calcination time.

If the structure is alumina deficient, it is possible to calcine it in such a way that all of the defects or hydroxyl nests left in the structure from the removal of tetrahedral alumina are closed so that the cell constant is exactly that of the stabilized structure. At this point, the SiO₂/Al₂O₃ ratio calculated from the cell constant will exactly match that of the crystal structure. This unit cell size will be referred to as being the "stoichiometric unit cell size." Further calcination starts to remove alumina from the crystal structure to non-framework positions with further lowering of the cell constant. It is reasonable to expect that the rate of change in unit cell size would be different for the two processes with the closure of the voids being faster than the expulsion of alumina from framework. Sample 4B was calcined under a variety of conditions and the unit cell constant measured on the calcined samples. The data are summarized in FIG. 3. The break in the curves at 24.44 Å from the 1100° and 1200° F. calcinations is taken to be the stoichiometric unit cell size. Samples of 4A were treated in a similar manner and the break in the curves was found at 24.45 Å showing that this material was less alumina deficient than sample 4B.

TABLE IV

| Sample | Zeolite No. 4 | 4A | 4B |
|---|---|---|---|
| Chemical Analysis, Wt. % | | | |
| $SiO_2$ | 78.0 | 81.7 | 82.0 |
| $Al_2O_3$ | 23.7 | 17.9 | 14.6 |
| $Na_2O$ | 0.15 | 0.12 | 0.11 |
| $SiO_2/Al_2O_3$ | 5.58 | 7.76 | 9.53 |
| Physical Properties | | | |
| X-Ray Crystallinity, % | 224 | 184 | 192 |
| Cell Constant After Drying @ 250° F. | 24.52 | 24.52 | 24.48 |
| Stoichiometric | 24.51 | 24.45 | 24.44 |
| Alumina Deficiency, % | 0 | 26 | 17 |
| Alumina Type, gms/100 gms | | | |
| $SiO_2$ | 30.4 | 21.9 | 17.8 |
| Total | | | |
| Crystalline | 20.2 | 15.7 | 15.1 |
| Amorphous | 10.2 | 6.2 | 2.7 |

Neither Sample 4A nor 4B is a zeolite in accordance with the present invention. See example 4 where they are converted to zeolites of the present invention.

Once the stoichiometric unit cell size has been determined, it is possible to divide the alumina in each sample into crystalline (zeolitic) alumina and amorphous (non-zeolitic) alumina. This is done by subtracting the amount of the crystalline alumina calculated from the stoichiometric unit cell constant from the total amount of alumina, as determined by chemical analysis. Since silica is not soluble in the acid solutions used to extract alumina, it is convenient to account for the alumina by ratioing it to a constant amount of silica. For uniformity, the alumina deficiency in this and subsequent examples is based on the difference in alumina content between the structures defined by the stoichiometric cell constant and that for the dried sample. This method accounts for the small amount of structural rearrangement and partial loss of alumina deficiency that sometimes occurs between acid extraction and rare earth exchange. Using the methods described above, it was calculated that sample 4A was 26% alumina deficient and that sample 4B was 17% alumina deficient. Even though more total alumina was removed from sample 4B, the sample had partially rearranged under reaction conditions as shown by the lowering of the cell constant to 24.48 Å with essentially no change in X-Ray crystallinity. The net effect was that the percent of alumina missing from the crystal structure is less for sample 4B than for 4A where no such rearrangement took place.

EXAMPLE 4

Sample 4A was converted to the material of this invention by exchanging it with rare earth ions. The sample (10 lbs dry basis) was stirred into 60 lbs of water. The pH of the slurry was adjusted to between 4.0 and 4.5 with dilute sulfuric acid and 2.5 liters of the same rare earth chloride solution described in example 2 was added. The mixture was heated to 135° F. and stirred for 2 hours. The solid was removed by filtration and then given a second two hour rare earth exchange under the same conditions as above. The solid was recovered by filtration and washed by stirring in 50 lbs of hot water for about 20 minutes. The material was filtered, dried at 250° F. and labeled sample 5A. Sample 4B was treated in an identical manner to produce sample 5B. The inspections on these samples are given in the table V along with the cell constants measured after the standard heat treatment. In both cases, the cell constants show that rare earth exchange stabilized the structure in an alumina deficient state.

TABLE V

| Sample | 5A | 5B |
|---|---|---|
| $RE_2O_3$, Wt. % | 6.88 | 6.46 |
| X-Ray Crystallinity, % | 107 | 112 |
| Cell Constant After Heating, Å | | |
| 2 Hrs @ 1300° F. | 24.47 | 24.51 |
| 1 Hr @ 1400° F. | 24.50 | 24.51 |
| 1 Hr @ 1500° F. | 24.47 | 24.49 |

Sample 5A and Sample 5B are zeolites in accordance with the present invention.

EXAMPLE 5

This example shows that almost complete rare earth exchange of the alumina deficient structures is required to achieve stabilization. Small portions of sample 4B were treated as in example 1, except that lesser amounts of rare earth were added to the ion exchange solutions. These samples are compared in Table VI with sample 5B. It can be seen that the lower levels of rare earths are not adequate to stabilize the structure in an alumina deficient state.

TABLE VI

| Sample | 5B | 6A | 6B |
|---|---|---|---|
| $RE_2O_3$, Wt. % | 6.46 | 2.06 | 0.93 |
| Cell Constant After Heating, Å | | | |
| 2 Hrs @ 1300° F. | 24.51 | 24.46 | — |
| 1 Hr @ 1400° F. | 24.51 | 24.45 | 24.45 |
| 1 Hr @ 1500° F. | 24.49 | 24.43 | 24.40 |

The zeolites of Sample 6A and 6B are not in accordance with the present invention.

EXAMPLE 6

A sample of a Y-type zeolite synthesized to have a high $SiO_2/Al_2O_3$ ratio having a silica to alumina ratio of 10.95:1, herein designated zeolite No. 7, was converted to the material of this invention by using the acid extraction and rare earth exchange procedures given in Examples 3 and 4. The zeolite starting material contained no amorphous alumina as shown by the fact that the silica/alumina ratio found by chemical analysis is in good agreement with that calculated from the cell constant. Since the starting material contained no amorphous alumina and the cell constant measured on sample 7A showed no shrinkage due to the acid extraction, the alumina deficiency of sample 7A can be calculated from either the chemical analysis or from the stoichiometric and dried unit cell sizes. As shown in Table VII, the agreement between the two calculation methods is

TABLE VII

| Sample | Starting Zeolite No. 7 | 7A | 7B |
|---|---|---|---|
| Acid Treatments | None | One | Two |
| Chemical Analysis, Wt. % | | | |
| SiO$_2$ | 83.7 | 91.2 | 94.0 |
| Al$_2$O$_3$ | 13.0 | 11.2 | 5.2 |
| Na$_2$O | 0.49 | 0.07 | 0.004 |
| SiO$_2$/Al$_2$O$_3$ | 10.95 | 13.84 | 30.73 |
| Physical Properties | | | |
| Crystallinity, % | 287 | 308 | 125 |
| Unit Cell, Å | 24.45 | 24.45 | 24.31 |
| After Drying At 250° F. | | | |
| Stoichiometric | 24.44 | 24.38 | 24.25 |
| Alumina Deficiency, % | | | |
| By Chemical Analysis | 0 | 23 | — |
| By Unit Cell Measurement | 0 | 30 | 50 |
| Rare Earth Exchanged RE$_2$O$_3$, Wt. % | | 3.08 | 2.38 |
| Unit Cell Size After Heating, Å | | | |
| 2 Hrs @ 1300° F. | — | 24.46 | 24.35 |
| 1 Hr @ 1400° F. | — | 24.49 | 24.35 |
| 1 Hr @ 1500° F. | — | 24.47 | 24.34 |

Samples 7A and 7B are zeolites of the present invention.

EXAMPLE 7

In this example, the low soda Y zeolite, No. 1, was calcined for 90 minutes at 1200° F. prior to being acid extracted. The calcined zeolite had a cell constant of 24.57. The calcined zeolite was then given a single acid extraction using the same procedure as that used for preparing 4A and then rare earth exchanged using the same procedure as that used for converting sample 4A to sample 5A. The inspections and thermal stability of the product, Sample 8, are shown in Table VIII.

TABLE VIII

| Sample | 8 |
|---|---|
| Chemical Analysis, Wt. % | |
| SiO$_2$ | 75.9 |
| Al$_2$O$_3$ | 18.5 |
| Na$_2$O | 0.40 |
| RE$_2$O$_3$ | 7.13 |
| Physical Properties | 127 |
| X-Ray Crystallinity, % | |
| Cell Constant, Å | |
| Dried at 250° F. | 24.57 |
| Stoichiometric | 24.49 |
| Al$_2$O$_3$ Deficiency, % | 26 |
| Unit Cell Size After Heating, Å | |
| 2 Hrs @ 1300° F. | 24.53 |
| 1 Hr @ 1400° F. | 24.53 |
| 1 Hr @ 1500° F. | 24.54 |

What is claimed is:

1. An aluminum deficient crystalline aluminosilicate zeolite having the crystal structure of a faujasite and having a composition, in its anhydrous state, in terms of mole ratio of oxides, as represented by the following formula:

$$(1-Z)(aM_2O + bR_2O + 3wRE_2O_3) \cdot (1-Z)Al_2O_3 \cdot XSiO_2$$

wherein RE represents a cation of a single rare earth metal or of a mixture of rare earth metals, wherein "w" ranges from a value of about 0.054 to about 0.217, said value w being the minimum amount of rare earth in said zeolite needed to stabilize said aluminum deficient zeolite; where R is an alkali metal cation; where M is selected from the group consisting of hydrogen ion, ammonium ion and mixtures thereof, wherein "a" ranges from zero to 1-3w; wherein "b" ranges from zero to 1-3w; wherein a+b+3w=1; wherein Z ranges from about 0.92 to 0.27, said value Z being the maximum fraction of alumina in the crystal structure that can be removed, and wherein X ranges from about 3.9 to about 54, said zeolite having a unit cell size ranging from about 24.25 to about 24.75 Angstroms, said zeolite having a unit cell size greater than the stoichiometric unit cell size when measured after heating for two hours at 1300° F., said zeolite falling within the area of FIG. 1 designated "stabilized zone".

2. The zeolite of claim 1 wherein said zeolite is composited with catalytic metals of Group IB, IIA, IIB, IIIB, IVA, IVB, VB, VIB, VIIB, VIII and mixtures thereof of the Periodic Table of Elements.

3. The zeolite of claim 1 wherein X equals 3.9 and said unit cell size is 24.75 Angstroms.

4. The zeolite of claim 1 wherein X equals 54 and said cell size is 24.25 Angstroms.

5. The zeolite of claim 1 wherein said zeolite is represented by the formula:

$$0.20(NH_4)_2O \cdot 0.05Na_2O \cdot 0.25RE_2O_3 \cdot Al_2O_3 \cdot 9SiO_2.$$

6. The zeolite of claim 1 having been prepared by the steps which comprise:
 (a) contacting a Y-type zeolite with a dealuminating agent for a time sufficient to remove at least about 5% of the aluminum atoms from said zeolite;
 (b) contacting the resulting dealuminized zeolite with a fluid medium comprising rare earth metal cations to produce a rare earth metal exchanged zeolite; and
 (c) calcining the rare earth exchanged zeolite to produce said aluminum deficient rare earth stabilized zeolite.

7. A method for the preparation of an aluminum deficient rare earth stabilized crystalline aluminosilicate zeolite, which comprises the steps of:
 (a) treating an initial Y-type crystalline aluminosilicate zeolite with a dealuminizing agent, said initial zeolite having the crystal structure of faujasite and having a composition, in its anhydrous state, in terms of mole ratios of oxides, represented by the formula:

$$(aM_2O + bR_2O) \cdot Al_2O_3 \cdot XSiO_2$$

wherein R represents an alkali metal cation; wherein M is a cation selected from the group consisting of hydrogen cation, ammonium cation, and mixtures thereof; wherein a+b =1; wherein "a" ranges from 0 to 1; wherein "b" ranges from 0 to 1; and wherein X ranges from 3.9 to 54; said zeolite having a unit cell size ranging from about 24.25 to about 24.75 Angstroms, said zeolite being treated at conditions and for a time sufficient to remove at least 5 percent of said aluminum from the structure of said zeolite;
 (b) contacting said zeolite during step (a) or after step (a) with an ion exchange medium comprising a rare earth metal cation to replace at least a portion of said M or R cation with a rare earth metal cation; and (c) recovering an aluminum deficient rare earth stabilized crystalline aluminosilicate represented by the formula of claim 1, and having a unit cell size greater than the stoichiometric unit cell size when measured after heating for two hours at 1300° F., and falling within the area of FIG. 1 designated "stabilized zone".

8. The method of claim 7 wherein said dealuminating agent is selected from the groups consisting of organic acids, inorganic acids, chelating agents and mixtures thereof.

9. The method of claim 7 wherein step (a) is conducted at a temperature ranging from 150 to 220° F. to remove at least about 5 percent of said aluminum from said crystal structure.

10. The method of claim 7 where said step (b) is conducted at a temperature ranging from about 60° F. to about 220° F.

11. The method of claim 7 wherein said initial zeolite has a silica to alumina mole ratio ranging from about 3.9 to about 54 and a unit cell size ranging from about 24.75 to about 24.25 Angstroms.

* * * * *